United States Patent [19]
Reck

[11] 3,838,569
[45] Oct. 1, 1974

[54] CATALYTIC CONVERTER OVERHEATING PROTECTION

[75] Inventor: Lothar Reck, Russelsheim/Main, Germany

[73] Assignee: General Motors Corporation, Detroit, Mich.

[22] Filed: July 16, 1973

[21] Appl. No.: 379,741

[30] Foreign Application Priority Data
Aug. 11, 1972 Germany............................ 2239549

[52] U.S. Cl..................... 60/277, 23/288 F, 73/346, 73/362, 236/46 F, 317/132, 337/141, 340/228 R
[51] Int. Cl......... F01n 3/14, G01k 1/08, G01k 7/00
[58] Field of Search..................... 60/277, 289, 288; 340/228 R, 417; 236/46 F; 73/347, 346, 362, 359 R, 341; 317/132; 337/140, 141; 23/288 F

[56] References Cited
UNITED STATES PATENTS

| | | | |
|---|---|---|---|
| 3,149,293 | 9/1964 | Farkas................ | 236/46 F |
| 3,159,824 | 12/1964 | Boddy................. | 317/132 |
| 3,197,754 | 7/1965 | Miles.................. | 340/228 R |
| 3,338,682 | 8/1967 | Fowler................ | 60/288 |
| 3,475,742 | 10/1969 | Whitney.............. | 73/362 R |
| 3,599,049 | 8/1971 | Barnard.............. | 340/228 R |

*Primary Examiner*—Douglas Hart
*Attorney, Agent, or Firm*—Peter A. Taucher

[57] ABSTRACT

A device for determining the prevailing temperature in a catalytic converter for a motor vehicle internal combustion engine, or other exhaust decontamination system, to provide an indication of the prevailing temperature, and/or automatically operate an overheating protection control, utilises a wire which is arranged in the catalytic converter and is electrically heated by a constant-amperage current. The resulting lengthening of the wire interrupts the heating circuit by opening corresponding contacts. The cooling times of the wire, before the contacts close again to initiate a further heating cycle, are dependent upon the prevailing temperature in the catalytic converter, and are utilised as an output magnitude for determining the temperature in the converter and/or switching on a warning indicator and/or switching off the converter.

The interruption and re-establishment of the heating current for the wire results in a square-topped curve, which can be converted by an integrator into a uniform current for operating the respective instruments.

7 Claims, 9 Drawing Figures

CATALYTIC CONVERTER OVERHEATING PROTECTION

This invention relates to a device for protection against overheating, either automatically or by indicating the prevailing temperature, in catalytic converters (reactors) for motor vehicle internal combustion engines, or other exhaust decontamination systems.

With catalytic converters for decontaminating motor vehicle exhaust gases, it is of the utmost importance for correct operation of the converter to avoid overheating, which could cause irreparable damage to the converter and might arise for example through the failure of a spark plug. It is therefore important to have a reliable indication of the prevailing temperature in the converter so that incipient overheating may be recognised in good time and remedied.

An object of the present invention is to provide such an indicating or automatic protection device which is of relatively simple construction and yet is accurate and reliable in operation.

By the invention, this object can be achieved by arranging a wire, electrically heated with constant amperage, in the exhaust decontamination system, which wire automatically interrupts the heating circuit by opening contacts upon becoming lengthened due to the heating, and automatically re-establishes the heating circuit after cooling, and utilising the cooling times of the heating wire, which are dependent upon the prevailing temperature in the exhaust decontaminating system, as an output magnitude for determining and indicating the prevailing temperature in the exhaust decontamination system and/or as a signal for switching off the exhaust decontamination system.

The heating current causes the heating wire to become lengthened. Upon attainment of a predetermined temperature, and a corresponding lengthening, the current supply is automatically discontinued. The cooling times of the wire, that is the times required for it to contract to a length at which the contacts close again for supplying current for heating, will be of differing duration depending on the prevailing temperature difference between the heating wire and the exhaust decontamination system surrounding it. Thus if the cooling-off times exceed a certain value (so that the switch-off periods become correspondingly great) this is an indication that the prevailing temperature in the converter has risen, since the rate of cooling of the wire has fallen off. The square-topped curve of the heating current, resulting from the switching-on and switching-off of the heating circuit, may be converted into a current which is uniform, or relatively so, by means of an integrator. The magnitude of this uniform current leaving the integrator may be used for a warning indicator, or for operating an actuating device for the purpose of averting damage due to overheating.

A preferred feature of the invention which is particularly suitable for a catalytic converter in an exhaust decontamination system in the mounting of the heating wire in a sleeve which is enclosed on all sides by the catalyst material of the converter. This not only ensures optimum heat transfer from the catalyst material to the heating wire but also ensures that axial displacement of the wire due to its change in length is unimpeded by the catalyst material surrounding it.

In order that the consumption of heating current for warming up the heating wire may be kept low, the heating wire should be as long as possible. For this purposes, good results may be achieved by arranging for the length of the sleeve and of the heating wire to correspond to at least the entire width of the catalytic converter.

One end portion of the heating wire may be firmly connected to one end of the sleeve, with the other end portion of the heating wire protruding from the associated open sleeve end and forming one contact for operating the heating current circuit.

The sleeve enclosing and guiding the heating wire will generally consist of a material having a relatively low coefficient of thermal expansion as compared with the heating wire. Therefore, insofar as these substances are able to withstand the vibration of the vehicle, ceramic material and glass are suitable materials for the sleeve. Moreover, excellent test results have been attained by making the sleeve of a steel having a content of about 36 percent by weight nickel, and producing the heating wire from a steel of a composition corresponding to the designation X 15Cr Ni Si 2520. The first-mentioned material has a coefficient of thermal expansion of about $0.9 \cdot 10^{-6}$ cm/cm ° C, whereas the coefficient of expansion of the lateral material is about $19 \cdot 10$ cm/cm ° C.

If a ceramic or glass tube is employed, it is possible — on account of the low thermal expansion and conductivity of this material — to match the bore of the tube approximately to the diameter of the heating wire, so that optimum guiding of the wire can be achieved without further aids. However, when a steel tube is used, it is desirable to make the diameter of the bore substantially greater than that of the heating wire, and in order to ensure satisfactory guiding of the wire the heating wire may be guided inside the sleeve at individual places by means of cemented-in ceramic bushes.

A closure member which shuts off and seals off the the filler aperture of the converter may be utilised as a switch casing for accommodating a contact located at a free end portion of the heating wire, as well as a further contact co-operating with this contact, for which purpose the closure member may be made hollow and be secured, as by welding or cementing, to the sleeve. By incorporating the temperature sensing device as part of a closure plug for the converter in this way, the advantage of simple fitting and exchange of the temperature sensing device is obtained.

Since the sleeve as well as the heating wire is subject to changes in length due to thermal expansion, it is further proposed that the closed end of the sleeve, remote from the closure member, should be guided in axially movable fashion in a tubular support connected to the converter casing.

In order to prevent buckling or lateral deflection of the heating wire during its elongation due to thermal expansion, and so ensure reliable opening of the contacts of the heating circuit, the heating wire may be loaded in tension by a prestressed spring at the end portion provided with the co-operating contacts.

To reduce spark formation during the regular opening and closing of the contacts of the device, which operates in the manner of a two-point regulator, it is desirable to ensure that the contacts do not move towards each other gradually, in proportion to the change in length of the wire, but that they are brought into contact with said each other instantly once the switching temperature has been reached. Accordingly, a counter-contact actuated by a contact at the free end portion of the heating wire is advantageously secured to a resilient diaphragm which operates automatically with a snap action at a predetermined loading, with a switch element consisting of electrically non-conductive material and embracing the counter-contact with axial clearance being secured to the contact end. By means of the switch element, the diaphragm is withdrawn into its switching position during shortening of the wire, at a predetermined temperature during cooling. Due to the axial clearance between the switching element and the counter-contact, it is possible in a simple manner both to fix the spacing of the contacts with the heating circuit interrupted and to establish appropriate switching hysteresis such that the switching points for the cut-in and cut-out of the current do not lie at the same temperature.

Simple adjustment of the snap position of the diaphragm, and consequently also of the switch points of the contacts, is made possible by arranging that the counter-contact is a screw, adjustably arranged in a threaded ring at the centre of the diaphragm, and that the switching element engages behind the head of the screw forming the contact.

The spring loading the heating wire under tension must be stronger than the resilient force of the diaphragm so that when the heating wire lengthens the resistance of the diaphragm may be overcome. This spring loading the heating wire under tension is preferably a compression spring seated against the closure member by way of a ceramic seat, and also seated against a face of the switching element.

Figure 1:
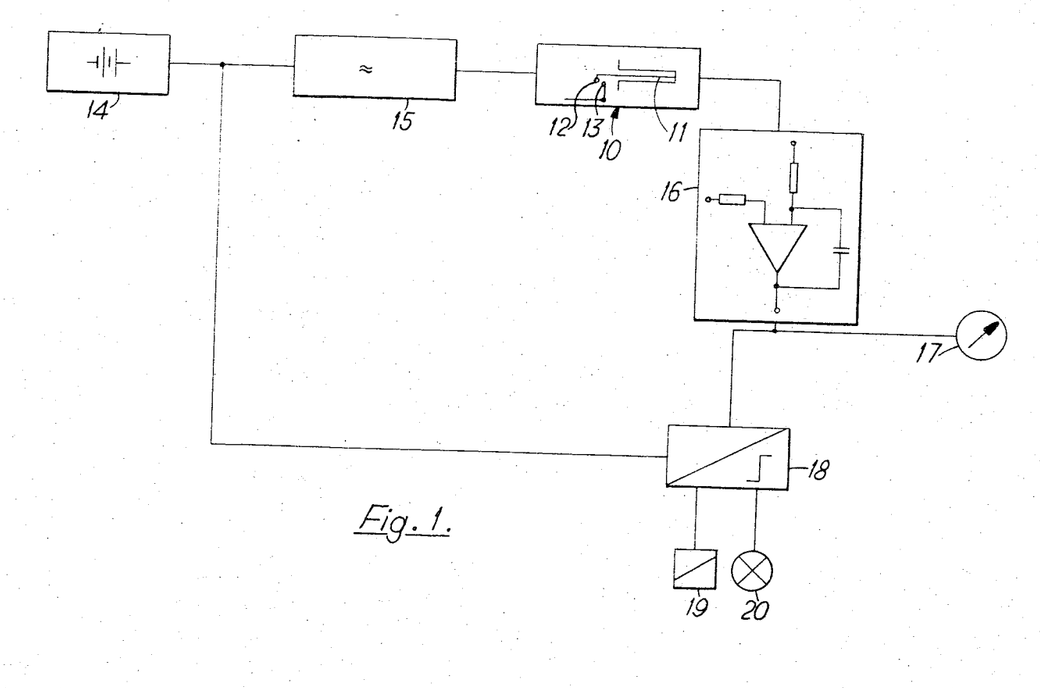
FIG. 1 illustrates, in the form of a schematic circuit arrangement, the mode of operation of the device in accordance with the invention.

As is schematically indicated in FIG. 1 of the drawings, a temperature sensor 10 for a catalytic converter acting as an exhaust decontamination system for exhaust gases from an internal combustion engine of a motor vehicle consists of a heating wire 11 provided at one end with a contact 12 which co-operates with a counter-contact 13. The heating wire 11 and the contacts 12 and 13 are components of a heating circuit which is fed from the vehicle battery 14 through a heating power generator 15, for example a simple voltage divider or a voltage transformer. If the temperature in the catalytic converter is high enough, the heating wire 11 becomes elongated, due to its coefficient of expansion, sufficiently to open the contacts and thereby interrupt the current supply. The heating wire 11 rapidly cools down, at a rate which is dependent upon the prevailing temperature in the converter. Thereby the wire becomes shorter, until at a certain temperature it switches the electrical power on again. This mode of operation continues cyclically, in the manner of a two-point regulator. This switching between an upper temperature and a lower one takes place in accordance with a time frequency of substantially equal switch-on duration but variable switch-off duration. An integrator 16 converts this frequency into a varying direct current. A measuring instrument (temperature indicator) 17 is connected to respond to the output voltage of the integrator 16, and this output voltage is also supplied to a measuring trigger 18 in order to switch on a control device 19 and/or a warning lamp 20 at a certain temperature.

Figures 2, 3:
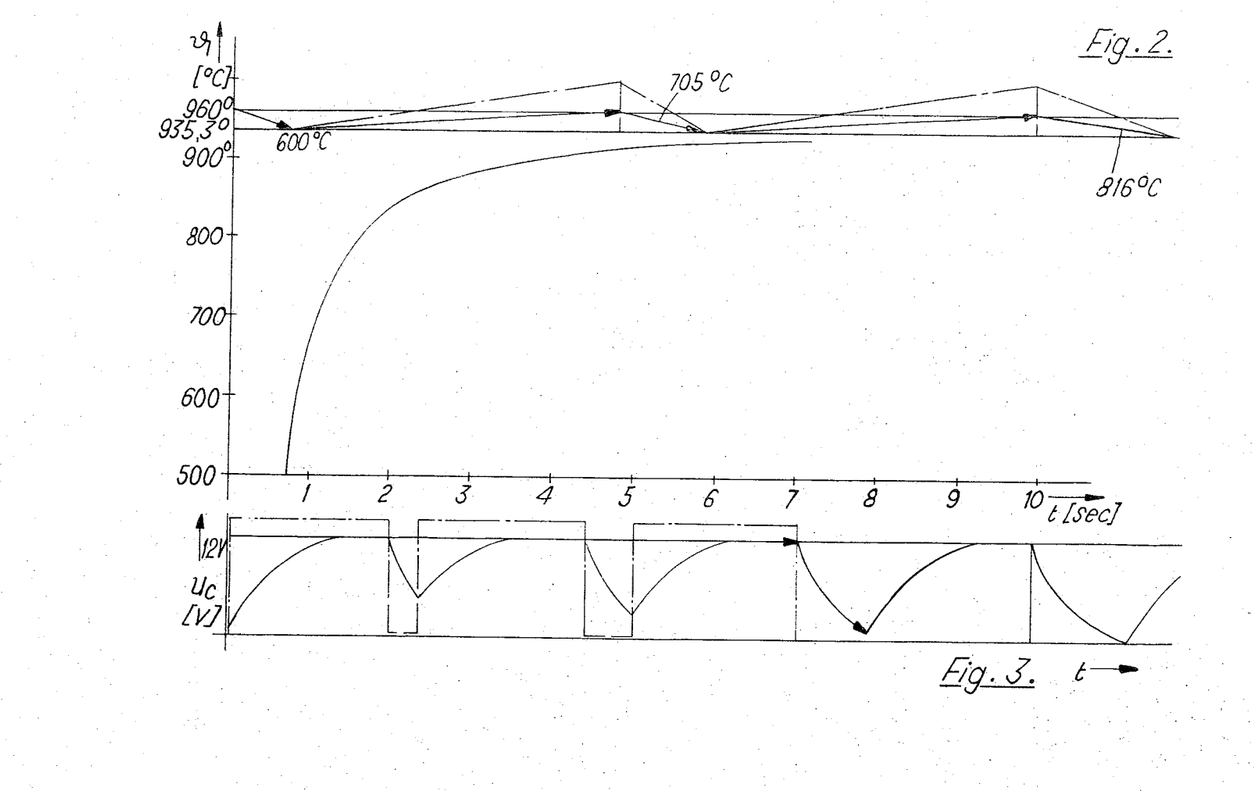
FIG. 2 is a diagrammatic representation illustrating the cooling curve which results from the cooling-off times of a heating wire cooled from 960°C to 935.3°C, at various converter temperatures.
FIG. 3 is a diagrammatic representation illustrating the charging and discharging behaviour of the integrator condenser during periodic switch-on and switch-off of the heating current.

From the cooling-off curve in FIG. 2 it is possible to read off the time which the heating wire 11 requires, at the prevailing converter temperature, to cool down from 960°C (the selected upper temperature at which the heating current is switched off) to 935.3°C (the selected lower temperature at which the heating current is switched on again). The corresponding times can also be read off from the upper curve, which illustrates the idealised course of temperature in the heating wire, plotted against time, with the dash-dot line indicating the warming-up with a larger heating current and a higher upper switching temperature.

In order to set the upper switching temperature (in the present example 960°C) all that is necessary is to measure the first warming-up period, with the converter cold, up to the first switch-off of the heating current. The length of the succeeding warming-up times indicates the temperature hysteresis. The length of the warming-up period may be adjusted by varying the heating power, and the switch-off time can be adjusted to some extent by varying the upper switching temperature. The lower condenser voltage curve (FIG. 3) shows that the measuring current depends solely on the charging and discharging times of the condenser.

Figure 4:
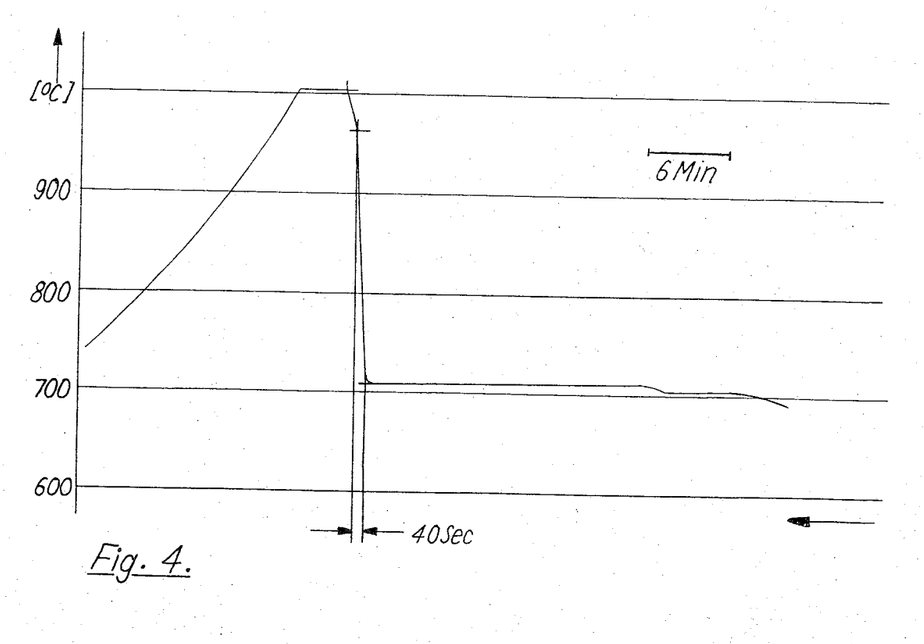
FIG. 4 is a graph showing diagrammatically the course of temeprature plotted against time for a catalytic converter, when simultating a spark plug failure.

From FIG. 4 it can be seen that, with normal operation of the spark plugs, the converter temperature lies approximately at 700°C, but in the event of failure of a spark plug it rises within an interval of only 40 seconds up to the temperature of 960°C already designated above as the upper switching temperature, and in its further progress it raises to above 1,000°C. If such high temperatures were maintained for a relatively long time, the catalyst mass would be destroyed. The measurement data in FIG. 4 were derived from a vehicle having a four-cylinder engine, in second gear, and travelling at a speed of 50 km/hr.

Figure 5:
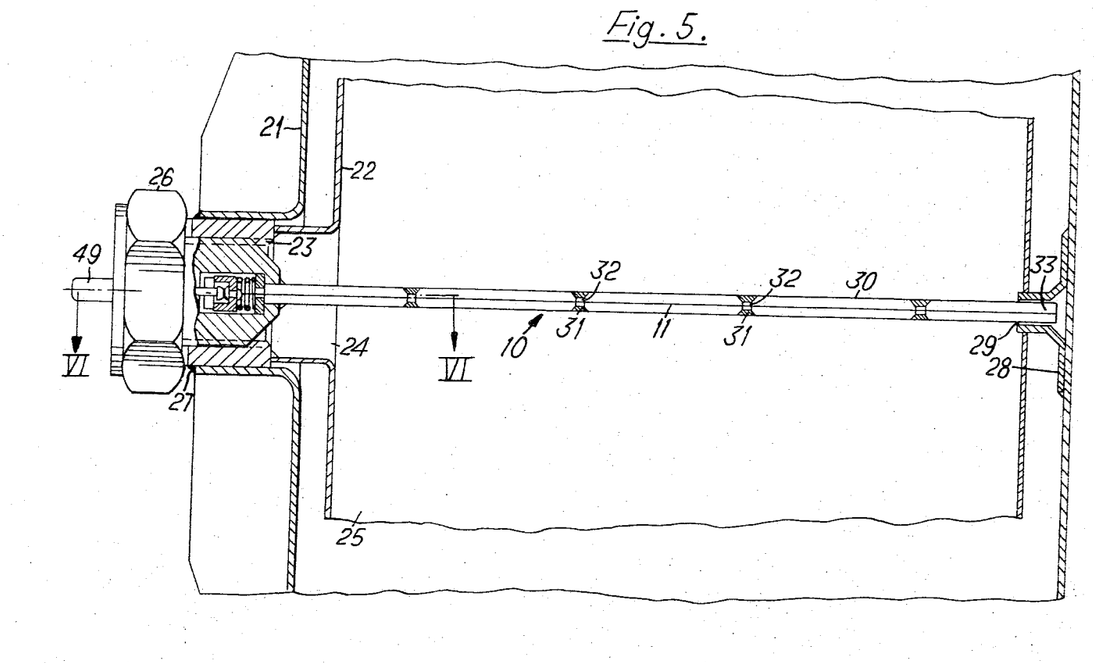
FIG. 5 is a fragmentary section through a catalytic converter, illustrating one embodiment of a temperature sensor device in conformity with the invention.

FIG. 5 illustrates one possible embodiment of the temperature sensor 10 which is shown schematically in FIG. 1. In FIG. 5, the reference numeral 21 designates the casing and 22 the converter bed of a catalytic converter. The converter bed has a large filler aperture 24 provided with an internal screw thread 23, and is filled with a catalyst mass 25 through this aperture 24. A closure member 27 for this aperture has a hexagon head 26 and forms one unit with the temperature sensor 10, as will be described in detail later. Opposite the aperture 25 a tubular support 28 is welded to the conveter wall 21, and the bed 22 is also welded to this support. The temperature sensor 10 is mounted in a guide bore 29 in the support 28 in a manner permitting longitudinal displacement.

Figure 6:
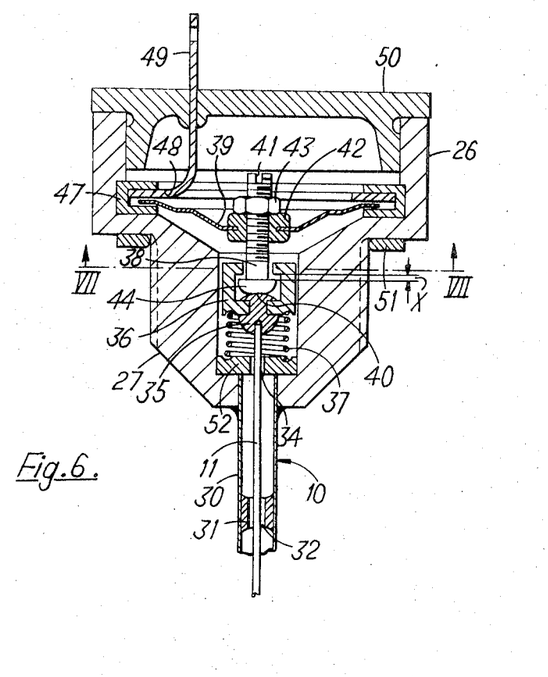
FIG. 6 is an enlarged section in the plane represented by the line VI—VI in FIG. 5, looking in the direction of the arrows.

From FIGS. 5 and 6 it can be seen that the temperature sensor 10 consists of the aforesaid heating wire 11 which is mounted in a sleeve 30. This sleeve consists of a metal having a comparatively low coefficient of thermal expansion, for example a steel having a content of 36 percent by weight nickel, whereas the heating wire 11 itself has a high coefficient of thermal expansion, in that it consists of a stainless steel, specifically the material with a composition corresponding to the designation X 15Cr Ni Si 2520. Within the sleeve 30 there are cemented individual ceramic bushes 31 in whose central bores 32 the heating wire is mounted and guided with clearance. The heating wire 11 is secured at one end to one end 33 of the sleeve 30.

Figure 8:
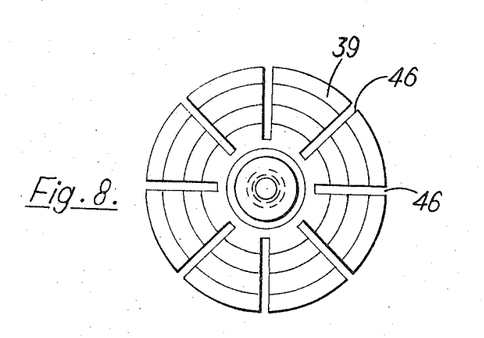
FIG. 8 is a plan view illustrating a diaphragm which is shown in section in FIG. 7.

At its other end, the sleeve 30 is press-fitted into the closure member 27 (see FIG. 6) and is secured to the latter by welding (or by an adhesive). The heating wire 11 is guided in a bore 34 of the closure member 27. A rivet 35 connects the heating wire 11 to a switch element 36. A spring 37 loads the wire heating wire 11 in tension and biases the rivet 35 for the switch element 36 against an adjusting contact screw 38 at a contact point 40. A resilient switch diaphragm 39 forming a support for the adjusting contact screw 38 is so designed that, when loaded, it first expands radially and then, at a certain position, operates with a snap action. The radial expansion is made possible by radially arranged slots 46, shown in FIG. 8. The snap-over position may be varied by turning the adjusting contact screw 38 (by means of a slot 41) relative to a threaded ring 42 of the switch diaphragm, the adjusted setting being maintained by means of a lock nut 43.

Figure 7:
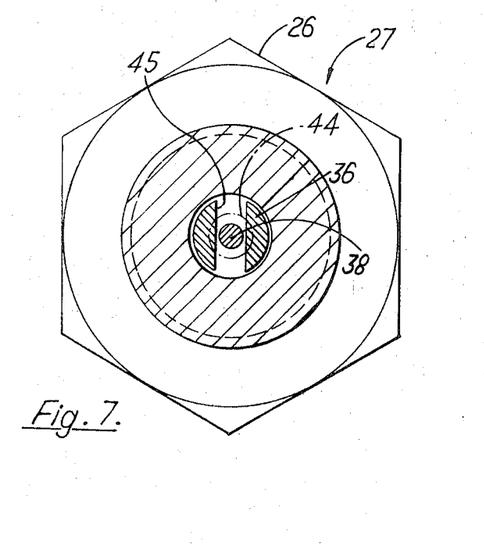
FIG. 7 is an enlarged cross-section in the plane represented by the line VII—VII in FIG. 6, looking in the direction of the arrows.

The switch element 36 is made of ceramic material and, as can be seen from FIG. 7, is so designed that a head 44 of the adjusting screw 38 can be pushed into a longitudinal groove 45.

As FIG. 6 shows a clearance "X" is provided between the counter-contact (screw head 44) and the switch element 36. This clearance "X" determines the spacing of the contacts 40, 44 in their open condition, and also determines the switching hysteresis, that is, the temperature difference between the switch-on and switch-off of the heating circuit (according to FIG. 2, the temperatures are respectively 935.3°C and 960°C.).

The switch diaphragm 39 is guided in an insulating ring 47 and against a contact ring 48 (with contact terminal 49). The increase in diameter of the switching diaphragm 39 during its radial expansion must be allowed for in the insulating ring 47. The contact terminal 29 is push-fitted through a cover 50 made of plastics material, which in turn is press-fitted into the closure member 27 to seal off the latter against dirt.

As already stated, the closure member 27 is provided with a hexagon head 26, which allows the temperature sensor 10 to be screwed firmly into the converter 21. Improved sealing is provided by an asbestos ring 51.

Figure 9:
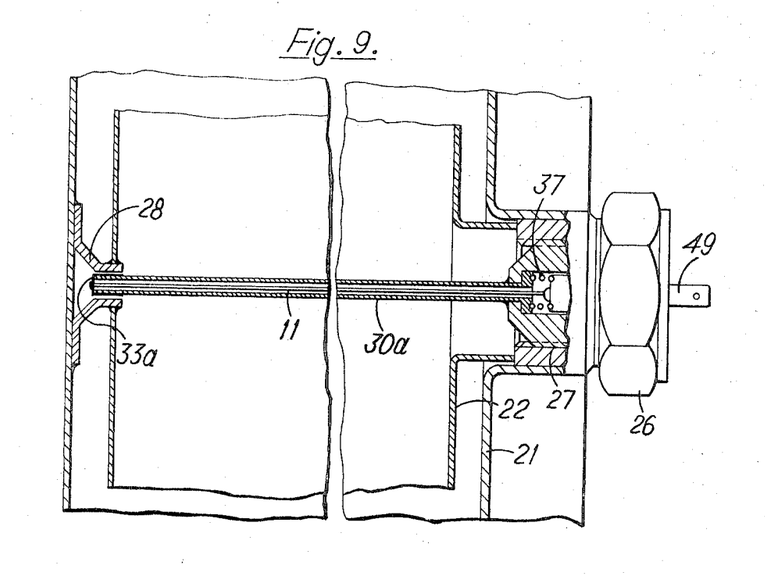
FIG. 9 is a fragmentary section, generally similar to FIG. 5, illustrating another embodiment of a temperature sensor device in conformity with the invention.

The embodiment shown in FIG. 9 differs from that shown in FIGS. 5 to 7 merely in that the sleeve — here designated 30a — surrounding the heating wire 11 consists of ceramic material or glass instead of metal. Such ceramic-type material is particularly advantageous on account of its low thermal expansion and conductivity, and moreover (as contrasted with FIGS. 5 and 6) the heating wire 11 may be mounted directly in the bore of the sleeve 30a and does not need any individual cemented-in guide bushes. In the embodiment shown in FIG. 9, one end of the sleeve 30a forms a seat for the pre-stressed spring 37 directly, whereas in the embodiment shown in FIGS. 5 and 6 a separate spring seat 52 of ceramic material is provided. The heating wire 11 passes with a little clearance through the sleeve 30a and is soldered at its end to a metallic end cap 33a which connects the heating wire 11 to ground (negative terminal of the battery) via the tubular support 28.

The device described operates as follows. When the vehicle ignition is switched on, voltage is applied to the contact terminal 49. A current then flows via the contact ring 48, the switch diaphragm 39, the adjusting screw 38 and the rivet 40 through the heating wire 11 to the end 33 (or 33a) of the sleeve 30 (or 30a), which is connected to ground.

The heating wire 11 thereby heats up and lengthens, so displacing the switch element 36 in opposition to the force of the diaphagm. The diaphragm 39 expands radially and, upon attainment of the switching temperature, the diaphragm rapidly operates with a snap action to move the head 44 of the adjusting screw 38 out of contact with the rivet 35 of the switch element 36. The result is that the current is interrupted so that the heating wire 11 is allowed to cool off, in doing which it pulls back the switch element 36. Upon attainment of the snap-over position, the adjusting screw 38 again engages the contact 40 and heating current flows once more. This cycle of operation is repeated until the engine is shut off.

The switching diaphragm 39 is chosen to reduce spark formation. The point at which the diaphragm 39 snaps over is set by means of the adjusting screw 38, and establishes the upper temperature. Since the cooling-off time is extremely short when the converter is cold, the integrator 16 (FIG. 1) will give a high output voltage and consequently the indicating instrument will make a full deflection under these conditions in contrast to what is the case with the system switched off. If the converter has reached the lower switching temperature, then the instrument makes its smallest deflection, and so as a practical matter the lower switch point should lie above the highest admissible converter temperature.

Thus a substantial advantage of the device in accordance with the invention is that it shows that it is an operative condition by giving a deflection when the ignition is switched on. Production tolerances may be compensated for by simple adjusting of the switching diaphragm 39 and of the heating current, with measurement of the warming-up times.

I claim:

1. A device for determining the prevailing temperature in an exhaust decontamination system, comprising a heating wire,
    means supporting the heating wire in the exhaust decontamination system, means including a heating circuit for supplying a constant-amperage current to heat the wire, contact means responsive to the length of the heating wire such that lengthening of the wire due to the heating thereof establishes a first condition of the contact means interrupting the supply of heating current to the wire, thereby permitting cooling of the wire to establish a second condition of the contact means restoring the supply of heating current to the wire, the cooling times of the wire being dependent on the prevailing temperature in the exhaust decontamination system, and means for utilising the cooling times of the heating wire to determine the prevailing temperature in the exhaust decontamination system.

2. A device for determining the prevailing temperature in an exhaust decontamination system, comprising a heating wire, means supporting the heating wire in the exhaust decontamination system, means including a heating circuit for causing a constant-amperage current to pass through the wire to heat the wire, contact means arranged to be opened by the wire on predetermined lengthening due to the heating thereof, to thereby interrupt the heating circuit and allow cooling of the wire and consequent closing of the contact means, for establishing a sequence of alternate heating and cooling of the wire corresponding to alternate switching on and switching off of the heating circuit, integrator means responsive to the square-topped curve of the heating current resulting from the alternate switching on and switching off of the heating current, to thereby produce a varying current the magnitude of which is indicative of the cooling times of the wire, and temperature indicator means responsive to the varying current from the integrator means to provide an indication of the prevailing temperature in the exhaust decontamination system.

3. A device for protecting against overheating in a catalytic converter in the exhaust system of a motor vehicle, comprising a heating wire having first and second end portions, a sleeve forms a supporting casing and guide for the heating wire and is enclosed on all sides by the catalyst mass of the converter, the sleeve consisting of a material having a relatively low coefficient of thermal expansion as compared with the heating wire, and the length of the sleeve being at least as great as the entire width of the catalytic converter, means fixedly connecting the first end portion of the heating wire to one end of the sleeve, the second end portion of the heating wire protruding from the other end of the sleeve, spring means acting on the second end portion of the heating wire to load the wire in tension, means including a heating circuit for causing a constant-amperage current to pass through the heating wire to heat the wire, first contact means forming part of the heating circuit, second contact means mounted on the second end portion of the heating wire and arranged to cooperate with the first contact means such that on predetermined lengthening of the wire due to the heating thereof the contact means are opened to thereby interrupt the heating circuit and allow cooling of the wire, with consequent closing of the contact means, and means for utilising successive cooling times of the heating wire as a control parameter for selectively cutting off the supply of hot exhaust gases to the catalytic converter.

4. A device according to claim 3, in which the heating wire consists of a stainless steel having a composition corresponding to the designation X15 Cr Ni Si 2520, the sleeve consists of a steel containing 36 percent by weight nickel, and the heating wire is guided within the sleeve at spaced locations by means of cemented-in ceramic bushes.

5. A device according to claim 3, including integrator means responsive to a square-topped curve of heating current resulting from successive interruption and reestablishment of the heating circuit, to thereby produce an output current which is indicative of the cooling times of the heating wire and hence of the prevailing temperature in the catalytic converter, and an actuating device responsive to the output current to the integrator means to thereby cut off the supply of hot exhaust gases to the catalytic converter whenever the prevailing temperature in the catalytic converter exceeds a predetermined value.

6. A device for protecting against over heating in a catalytic converter in the exhaust system of a motor vehicle, comprising a heating wire having first and second end portions, a sleeve which forms a supporting casing and guide for the heating wire and is mounted within the converter casing so as to be enclosed on all sides by the catalyst mass of the converter, a hollow closure cap closing off a filler aperture in one wall of the converter casing, a sleeve support connected to the inner surface of an opposite wall of the converter casing, means fixedly connecting the first end portion of the heating wire to one end of the sleeve and to a contact cap providing an electrical connection by way of the sleeve support on the converter casing to ground, the sleeve support providing a mounting for the said one end of the sleeve allowing some longitudinal displacement thereof, the second end portion of the heating wire protruding from the other end of the sleeve into the hollow interior of the closure cap, means fixedly connecting the said other end of the sleeve to the hollow closure cap, means fixedly connecting the second end portion of the heating wire to a switch element which is subject to the bias of a spring seated on the closure cap to load the heating wire in tension, a contact member which is connected to the second end portion of the heating wire by way of the switch element and embraces a counter-contact member with axial play, a resilient diaphragm forming a support for the counter-contact member and supported at its edges by an insulating ring mounted in the hollow closure cap, a contact terminal in electrical communication with the counter-contact member by way of the resilient diaphragm, heating circuit means connected to the contact terminal for causing a constant-amperage current to be supplied by way of the counter-contact member and the contact member to pass through the heating wire to heat the wire, such that lengthening of the wire due to its heating is transmitted as movement of the contact member to the counter-contact member until a snap-over condition of the resilient diaphragm is reached at which the contacts constituted by the contact member and the counter-contact member open rapidly with take-up of the axial clearance, whereby, with the supply of heating current to the heating wire thereby cut off, the wire cools down and shortens, with the switch element entraining the counter-contact member until the resilient diaphragm snaps over again to close the contacts for a further cycle of heating of the heating wire, and means including an integrator arranged to produce from the resulting intermittent course of the heating current a varying output current the magnitude of which is indicative of the cooling times of the heating wire, which are dependent on the prevailing temperature in the catalytic converter, to thereby provide an indication of the prevailing temperature in the catalytic converter.

7. A device according to claim 6, in which the counter-contact member is formed as an adjustment screw for varying the snap-over point of the resilient diaphragm, and hence the switch-off temperature for the heating circuit, and the switch element engages in jaw-like fashion behind a head portion of the adjustment screw.

* * * * *